No. 820,254. PATENTED MAY 8, 1906.
S. E. POWELL.
MIXING DEVICE.
APPLICATION FILED DEC. 13, 1904.

2 SHEETS—SHEET 1.

Inventor
Sarah E. Powell.

Witnesses
Phil C. Barnes,
W. H. Clark.

By Victor J. Evans
Attorney

No. 820,254. PATENTED MAY 8, 1906.
S. E. POWELL.
MIXING DEVICE.
APPLICATION FILED DEC. 13, 1904.
2 SHEETS—SHEET 2.
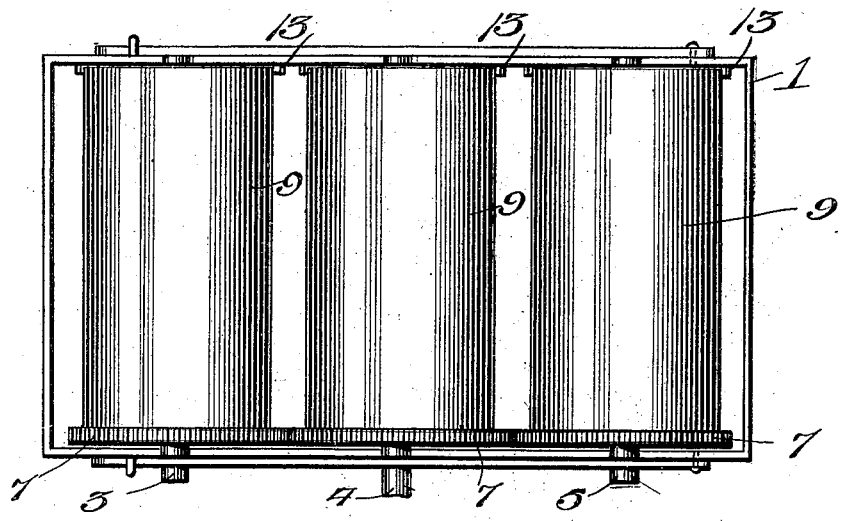
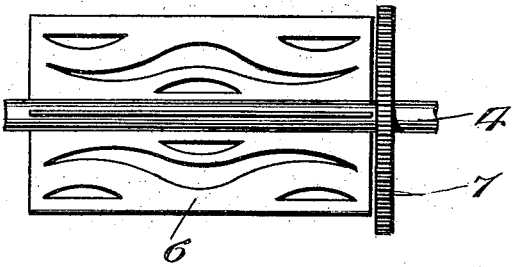
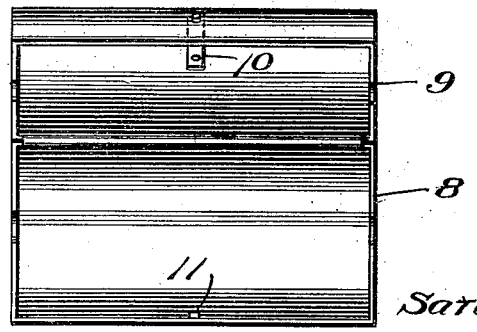
Witnesses
Phil. E. Barnus
W. H. Clarke
Inventor
Sarah E. Powell
By Victor J. Evans
Attorney

UNITED STATES PATENT OFFICE.

SARAH EMMA POWELL, OF FORT WORTH, TEXAS.

MIXING DEVICE.

No. 820,254.　　　Specification of Letters Patent.　　　Patented May 8, 1906.

Application filed December 13, 1904. Serial No. 236,696.

*To all whom it may concern:*

Be it known that I, SARAH EMMA POWELL, a citizen of the United States, residing at Fort Worth, in the county of Tarrant and State of Texas, have invented new and useful Improvements in Mixing Devices, of which the following is a specification.

This invention relates to mixing devices, such as are designed particularly for beating eggs and the like.

In making cake, for example, it is necessary frequently to beat the yolk of an egg at one operation, the white of an egg at another operation, and the cream, butter, and other ingredients at a third operation. It will be apparent that a considerable loss of time generally results from these three operations, not only from the necessity of beating the several ingredients, but likewise from the necessity of removing the contents and cleaning the mixing or beating device after each operation.

The object of the present invention is to avoid the loss of time occasioned by the several operations above set forth and to mix the several ingredients separate from each other at a single operation.

With the foregoing and other minor objects in view, which will appear as the description proceeds, the invention resides in a mixing device comprising a plurality of separate receptacles and means for mixing the contents of said receptacles simultaneously from a single source of power.

The invention also resides in the particular combination and arrangement of parts and in the details of construction hereinafter described and claimed as a practical embodiment thereof.

Figure 1:
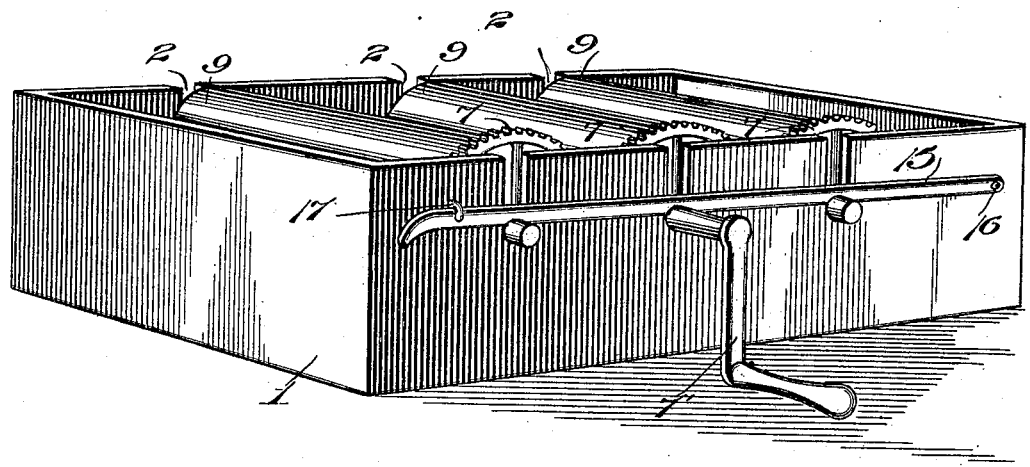
Figure 2:
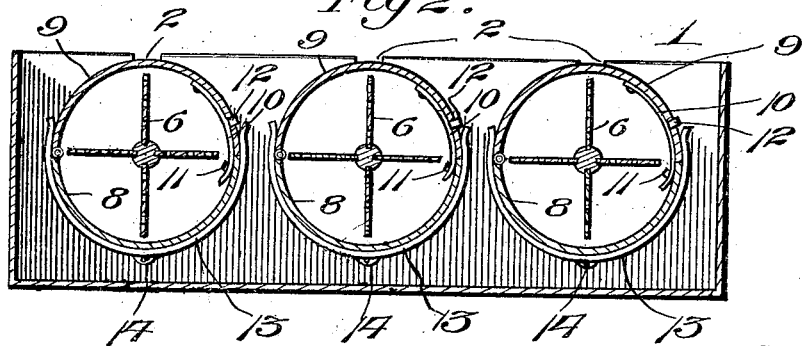

In the accompanying drawings, forming part of this specification, Figure 1 is a perspective view of a mixing apparatus constructed in accordance with the present invention. Fig. 2 is a vertical longitudinal section thereof. Fig. 3 is a plan view. Fig. 4 is a side elevation of one of the stirrer-shafts, showing the blades and the gear-wheel thereon. Fig. 5 is a detail view showing one of the receptacles in open position.

Like reference-numerals indicate corresponding parts in the different views.

The numeral 1 indicates a compartment which serves as a support for the several mixing devices hereinafter described. The compartment 1 is preferably rectangular in shape and is formed with a plurality of downwardly-extending slots 2, adapted to receive the outwardly-projecting ends of stirrer-shafts 3, 4, and 5. Each of the stirrer-shafts 3, 4, and 5 is provided with a plurality of stirrer-blades 6, such as shown in Fig. 4, each of said shafts also being provided with a gear-wheel, such as 7. The gear-wheel 7 of the several stirrer-shafts are intermeshed with each other in such manner that the rotation of one shaft is imparted to the other shafts. The central shaft 4 preferably is provided with a crank or other equivalent device 7' for imparting rotation thereto. Inclosing each of the stirrer-shafts and the stirrer-blades thereof is a receptacle 8, which is provided with a hinged cover 9, having a spring-catch 10, adapted to engage a projection 11, said spring-catch being disengaged from the projection 11 by pressure applied to a button or projection 12, extending outwardly through a suitable perforation in the cover 9. The several receptacles 8 are supported in the compartment 1 by means of suitable resilient cradle members 13, which are secured to opposite sides of the compartment 1, as shown at 14. The resiliency of the cradle members 13 permits the several receptacles 8 to be readily removed from and replaced in the compartment 1. In order to retain the several receptacles 8, together with their stirrer-shafts, securely in position, each of the stirrer-shafts 3, 4, and 5 is formed with a suitable annular groove, into which fits a lever 15, pivoted at 16 upon the compartment 1, the free end of said lever being held securely in engagement with the annular grooves of the several stirrer-shafts by means of a pivotal catch 17, which is adapted to be turned to permit the disengagement of the lever 15 from the annular grooves in the several shafts preparatory to the removal of the several receptacles 8.

Constructed as above described, the method of using the improved device is as follows: The several receptacles or mixing devices 8 are removed from the compartment 1 and opened. The yolk of an egg, for example, is placed in one of said mixing devices, the white in another, and the cream, butter, and other ingredients in a third. The cover of each mixing device is then closed, and the several devices are reinserted into the compartment 1, the resilient cradle members 13 serving to hold said receptacles securely in position and to prevent rotation thereof and the lever 15 serving to hold the several stirrer-shafts securely in position. By rotating the crank 7' the stirrer shafts and blades of the several mixing devices are rotated simultaneously, thus causing the several ingredients to be mixed thoroughly at a single operation.

From the foregoing description it will be apparent that the improved apparatus of this invention is adapted to avoid the loss of time and labor which results when the several mixing operations involved in the making of cake are performed successively.

Changes in the precise embodiment of invention illustrated and described may be made within the scope of the following claims without departing from the spirit of the invention or sacrificing any of its advantages.

Having thus described the invention, what is claimed is—

1. A mixer comprising a compartment, a plurality of resilient cradles mounted therein, horizontally-arranged receptacles supported in the cradles, mixing devices within the receptacles, and means for simultaneously operating said mixing devices.

2. A mixer comprising a compartment, a plurality of mixing devices contained therein, means for operating said mixing devices and a lever pivoted to the compartment and adapted to removably engage all of said mixing devices.

3. In an apparatus of the character described, the combination of a receptacle having a plurality of downwardly-extending slots therein, a plurality of resilient cradle members supported by said compartment, a plurality of cylindrical receptacles having covers, each of said receptacles being supported in the resilient cradle members, a stirrer-shaft in each of said receptacles, each of said stirrer-shafts fitting into the slots of said compartment and being provided with an annular groove, stirrer-blades on each of said shafts, a gear-wheel on each of said shafts, a crank on one of said shafts, a lever connected with said compartment and adapted to fit into the annular grooves of the several shafts, and a pivotal catch for holding said lever in position.

4. A mixer comprising a compartment, a plurality of mixing devices arranged within said compartment, each of said mixing devices including a shaft projected longitudinally beyond the one wall of the compartment and formed with an annular groove, and a lever pivotally connected to the compartment and adapted to engage all of said grooves.

5. A mixer comprising a compartment, a plurality of mixing devices arranged within said compartment, each of said mixing devices including a shaft projected longitudinally beyond the one wall of the compartment and formed with an annular groove, a lever pivotally connected to the compartment and adapted to engage all of said grooves, and means to secure the lever in operative position.

In testimony whereof I affix my signature in presence of two witnesses.

SADIE EMMA POWELL.

Witnesses:
E. B. REDMOND,
JORLANY CUMMINGS